United States Patent [19]
Aihara

[11] Patent Number: 5,603,068
[45] Date of Patent: Feb. 11, 1997

[54] DISPLAY DEVICE

[75] Inventor: Yoshihiko Aihara, Kanagawa-ken, Japan

[73] Assignee: Canon Kabushiki Kaisha, Tokyo, Japan

[21] Appl. No.: 569,458

[22] Filed: Dec. 8, 1995

[30] Foreign Application Priority Data

Dec. 13, 1994 [JP] Japan .................................. 6-332177

[51] Int. Cl.⁶ ...................... G03B 17/20; G02B 27/34; G08B 5/36
[52] U.S. Cl. ...................... 396/287; 396/296; 396/147; 349/61
[58] Field of Search ...................... 354/409, 471–475, 354/289.1, 289.12; 359/48, 49, 50

[56] References Cited

U.S. PATENT DOCUMENTS

| | | | |
|---|---|---|---|
| 4,560,264 | 12/1985 | Kitazawa et al. | 354/289.1 X |
| 4,788,569 | 11/1988 | Yamada et al. | 354/409 |
| 5,170,204 | 12/1992 | Mukai et al. | 354/409 |
| 5,361,119 | 11/1994 | Shida et al. | 354/409 |
| 5,432,578 | 7/1995 | Suzuki et al. | 354/289.12 |
| 5,543,958 | 8/1996 | Lebby et al. | 359/48 X |

*Primary Examiner*—W. B. Perkey
*Attorney, Agent, or Firm*—Robin, Blecker, Daley & Driscoll

[57] ABSTRACT

A display device includes a display element which is arranged to have a plurality of electrode areas and to permit selective switchover between a transmitting state and a diffusing state by controlling an electric field, and a light emitting source which is arranged in such a position as to make an illumination color thereof visually confirmable only in an electrode area of the display element which is made into the diffusing state. The device is arranged such that displays can be provided adequately with a single light emitting source even when it is necessary to use a plurality of display parts for providing displays independently of each other.

22 Claims, 7 Drawing Sheets

DISPLAY DEVICE

BACKGROUND OF THE INVENTION

1. Field of the Invention

This invention relates to a display device which is capable of switching between a diffusing state and a transmitting state.

2. Description of the Related Art

Figure 8:
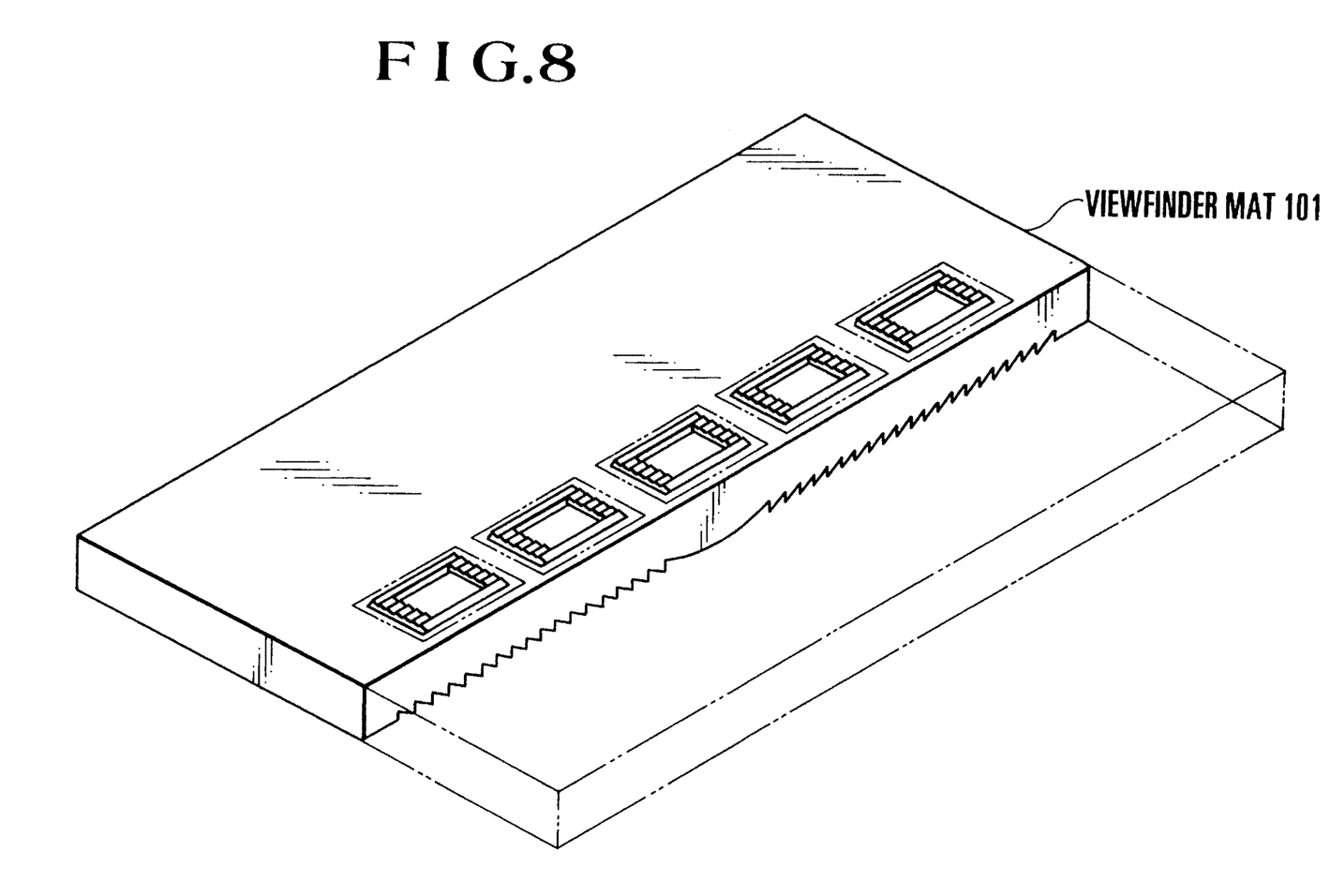
FIG. 8 is an oblique view showing a viewfinder mat used for the conventional superimposed display.

Some of known display devices are arranged to provide a superimposed display by engraving pictographs or letters with micro-prisms on the surface of a viewfinder mat of the camera and illuminating them with a light emitting diode to impart the same color as the illuminating light to the pictographs or letters located within an area upon which the illuminating light is impinging. The display device of this kind is described, for example, in U.S. Pat. No. 5,053,803. FIG. 8 shows a viewfinder mat 101 arranged for a superimposed display according to the above-stated method.

Referring to FIG. 8, the viewfinder mat 101 is adapted for a single-lens reflex camera of the kind having five focus detecting points for automatic focusing. A focus detecting point where an object of shooting which is in focus is located among others is illuminated with the light of an external light-emitting diode to cause the focus detecting point to show up in a red color.

The prior art display device described above, however, has been found in need of some improvement in the following points i) One light emitting source is required for every one of display parts which are arranged to provide a display independently of each other. Therefore, a total of five light emitting sources is required in a case where the camera has five focus detecting points like in the case of FIG. 8. These light emitting sources are arranged in the limited inside space of the camera complex and result in a cost increase.

ii) The display quality degrades, if the light of a display leaks to an adjacent display area to cause the adjacent display area to show up in part. To prevent this, the illuminating angle of the light emitting source must be severely adjusted and narrowed by using a lens.

iii) Generally, the viewfinder mat is made of a transparent moldable material such as an acrylic resin or the like. However, the use of such a material results in a poor transferability of the micro-prisms. Besides, the prism parts of molding dies are poor in durability.

iv) It is impossible to make the display color of one and the same display part variable from one color over to another, for example, to red, green or orange.

SUMMARY OF THE INVENTION

It is one aspect of this invention to provide a display device capable of switching between a diffusing state and a transmitting state for a transmitted light and making an illumination color of a light emitting source viewable in an area which is made into the diffusing state, wherein displays can be made adequately with a single light emitting source even when it is necessary to use a plurality of display parts for making displays independently of each other.

The above and other aspects and features of this invention will become apparent from the following detailed description of embodiments thereof taken in conjunction with the accompanying drawings.

DETAILED DESCRIPTION OF THE PREFERRED EMBODIMENTS

Figure 1:
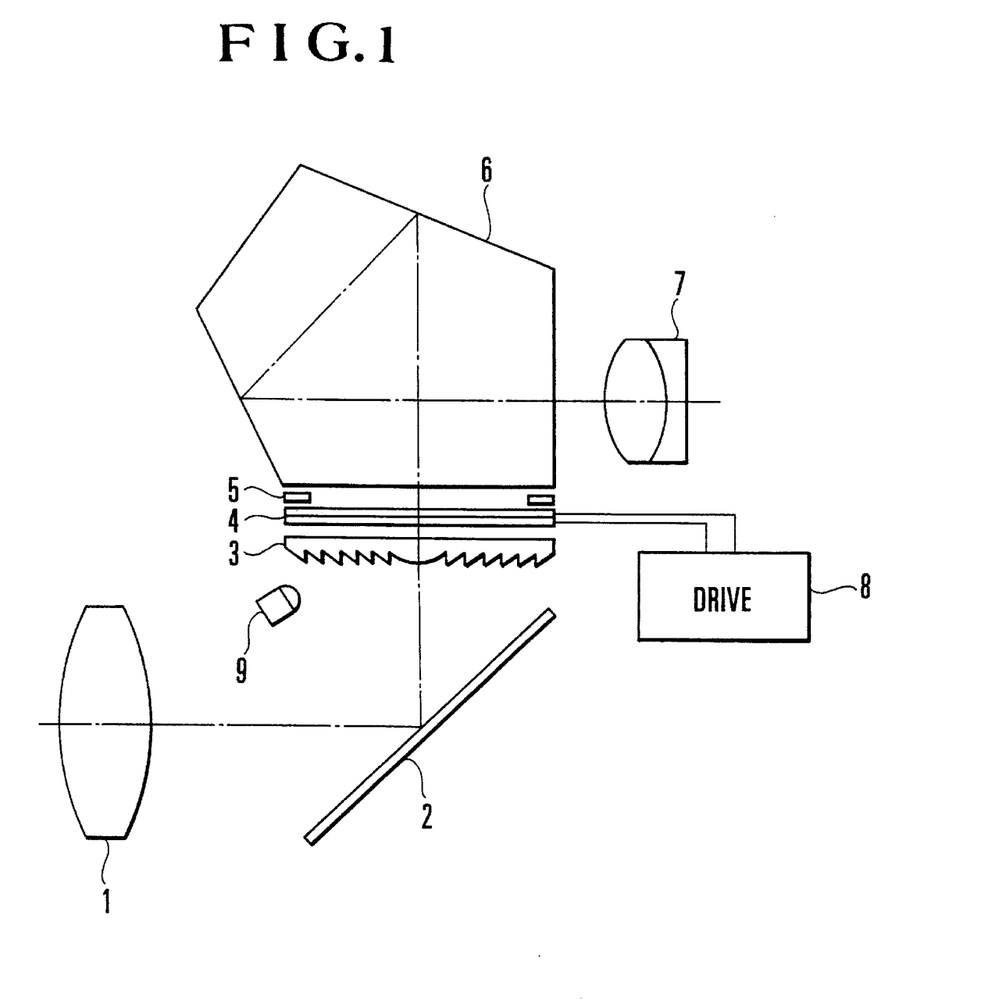
FIG. 1 is a schematic illustration showing the layout of the optical system of a single-lens reflex camera having a display device arranged according to this invention as a first embodiment thereof.

FIG. 1 shows the layout of the optical system of a single-lens reflex camera having a display device which is arranged as a first embodiment of this invention. The illustration includes a photo-taking lens 1, a main mirror 2 and a focusing screen 3. A liquid crystal plate 4 is made of a polymer-dispersed liquid crystal material and is capable of switching between a diffusing state and a transmitting state for a transmitted light. A voltage is arranged to be applied or not applied to the liquid crystal plate 4 for switching between the transmitting state and the diffusing state. The illustration further includes a field mask 5, a pentagonal prism 6, an eyepiece lens 7 and a driving circuit 8 which is arranged to drive the liquid crystal plate 4. A light emitting source 9 is, in the case of this embodiment, a light emitting diode which is arranged to emit a red light. The light emitting diode 9 is disposed in a position not blocking the photo-taking light flux of the photo-taking lens 1.

The photo-taking light flux which passes through the photo-taking lens 1 forms an image on a mat surface formed on an upper plane of the focusing screen 3 which is located in a position equivalent to the surface of a film. An object image formed on the mat surface is visually confirmed by the photographer through the eyepiece lens 7. Further, the focusing screen 3 does not have any such micro-prisms that are shown on the mat surface in FIG. 8 which shows the conventional superimposed display arrangement.

The image to be seen by the photographer is viewed through the liquid crystal plate 4 located near the mat surface. Therefore, while a part of the object image obtained in an area which is made into the transmitting state in the liquid crystal plate 4 is visually confirmed, another part of the object image obtained in an area which is made into the diffusing state in the liquid crystal plate 4, i.e., an area where light is subjected to scattering, cannot be clearly confirmed by the photographer. Further, the illumination light by the light emitting diode 9 is also scattered in the area which is made into the diffusing state, and the scattered light is seen in the same shape as a scattered pattern. Therefore, pictographs and letters consisting of patternized transparent electrodes arranged on two sides of the liquid crystal plate 4 are seen in a superimposed state in a red color on a superimposed display.

Figure 2:
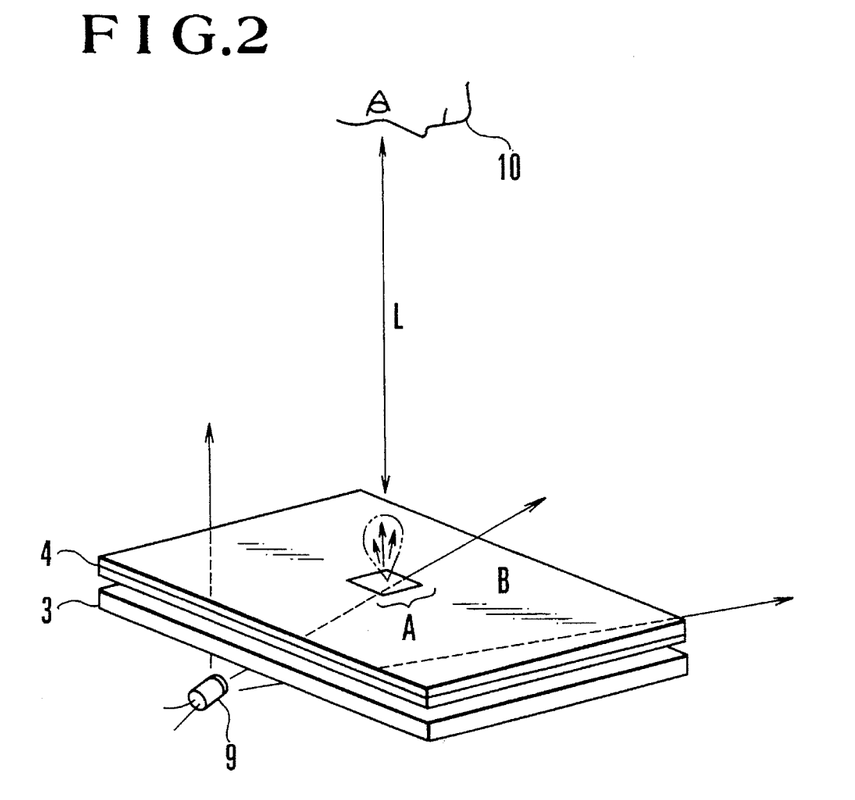
FIG. 2 is an oblique view showing a viewfinder of the single-lens reflex camera shown in FIG. 1.

This arrangement is described in further detail as follows. FIG. 2 is an oblique view of the viewfinder of the single-lens reflex camera shown in FIG. 1. The illustration includes the focusing screen 3, the liquid crystal plate 4 and the light emitting diode 9. They are the same parts as those shown in FIG. 1. Reference numeral 10 denotes a photographer.

In FIG. 2, the pentagonal prism is omitted from illustration and the photographer 10 is shown as in a position optically equivalent to a position obtained with the pentagonal prism and the eyepiece lens existing there. A distance L between the photographer 10 and the liquid crystal plate 4 is obtained with the length of an optical path bent through the pentagonal prism and multiplied by a coefficient set according to the power of the eyepiece lens. In the liquid crystal plate 4, a part A is in the diffusing state where light is scattered, and a part B is in the transmitting state where light goes and passes straight as it is.

In the light emitted from the light emitting diode 9, a light flux which passes through the part B as shown in FIG. 2 goes straight to a peripheral part without being seen by the photographer 10 in a case where the illumination is made from below the focusing screen 3 at an acute angle. Meanwhile, another light flux which passes through the part A is scattered, and a part of the scattered light comes to the photographer 10 to show the photographer 10 a superimposed display in a red color.

Figure 3:
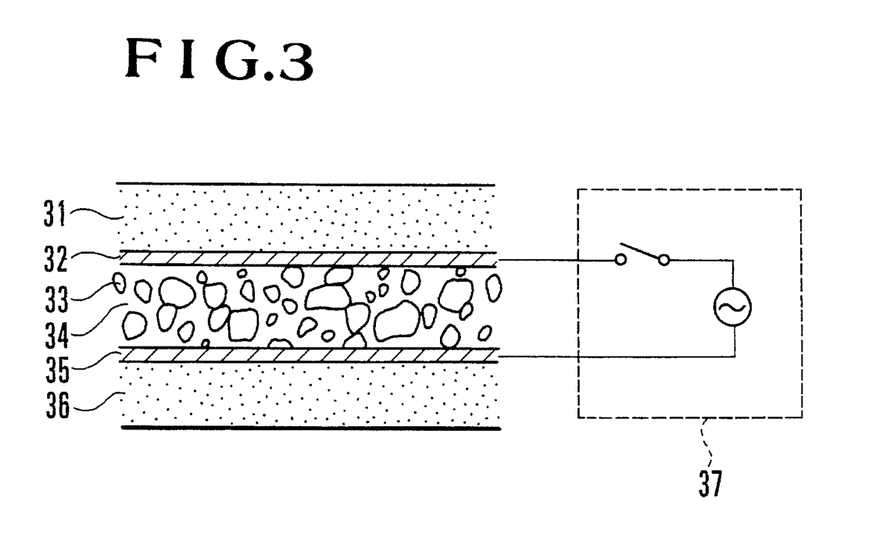
FIG. 3 shows the structure of a liquid crystal plate shown in FIG. 2.

FIG. 3 shows the internal structural arrangement of the liquid crystal plate 4 which is made of a polymer-dispersed liquid crystal material as a light transmitting member and arranged according to this invention to be capable of switching between a diffusing state and a transmitting state for a transmitted light.

Referring to FIG. 3, transparent base plates 31 and 36 are made of glass or the like and are provided for sealing the liquid crystal material between them. A transparent electrode 32 is formed with indium oxide or the like on the transparent base plate 31 and is divided into four segments, which are electrically isolated from each other. Since it is necessary to apply a voltage from outside, each of the four segments are provided with wiring around its periphery. This arrangement will be described in detail later with reference to FIG. 4.

Another transparent electrode 35 is formed with indium oxide or the like to extend all over the transparent base plate 36 without any particular pattern. The polymer-dispersed liquid crystal material is composed of elements 33 and 34. The element 34 is a polymer material, while the element 33 is a liquid crystal granular material dispersed within the polymer material 34. A driving circuit 37 is connected to the electrodes 32 and 35.

Figure 4:
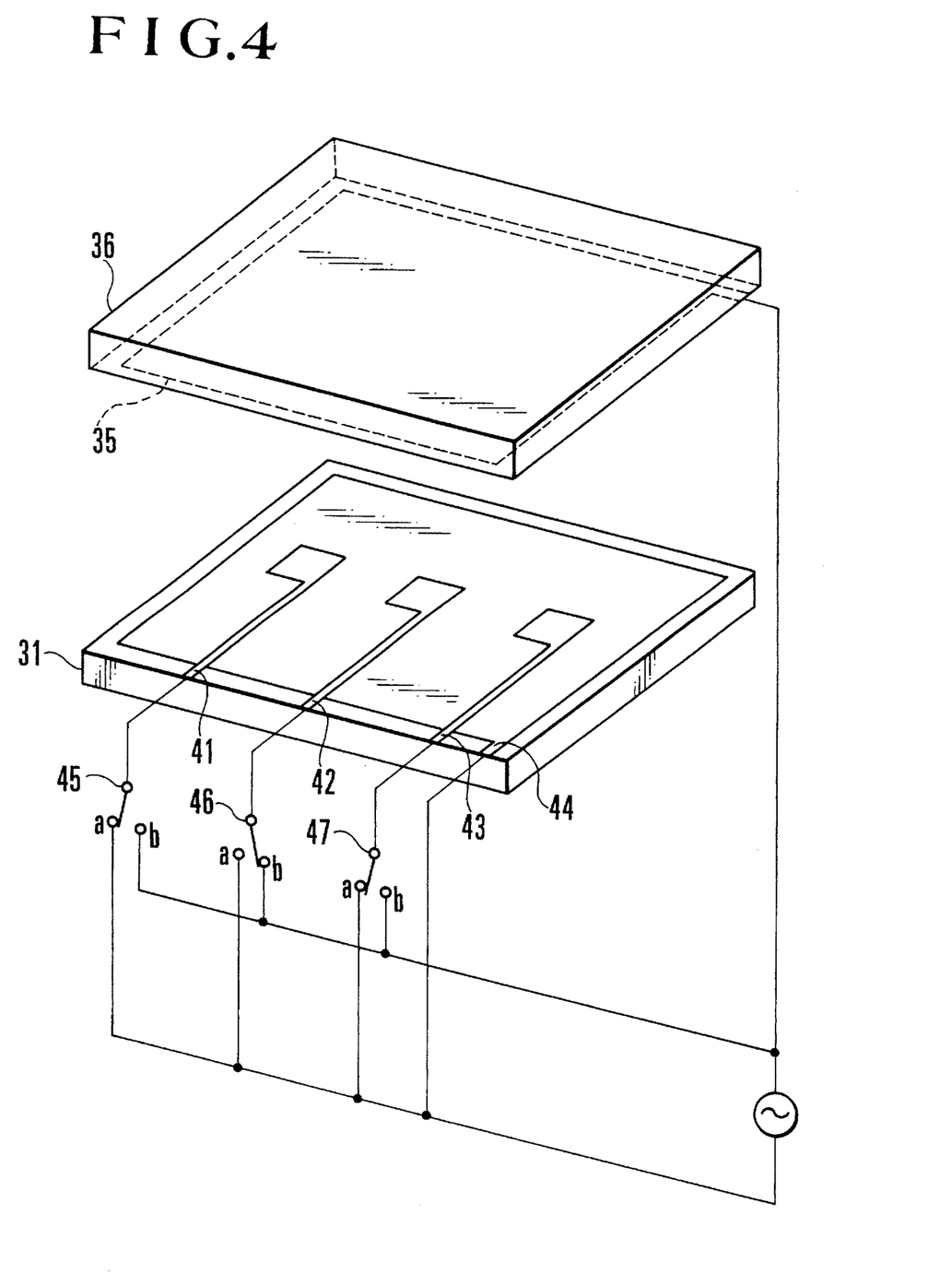
FIG. 4 shows the electrode pattern of the liquid crystal plate shown in FIG. 2.

FIG. 4 shows the electrode pattern of the liquid crystal plate 4. In FIG. 4, reference numerals 31 and 36 denote the transparent base plates made of glass or the like. Reference numeral 35 denotes the transparent electrode. Reference numerals 41, 42, 43 and 44 denote the transparent electrodes formed with indium oxide or the like on the transparent base plate 31 as four divided segments as shown in FIG. 4. In this case, there are three (left, middle and right) focus detecting points for automatic focusing, so that a display device is formed to provide a superimposed display indicating which of the three focus detecting points is in an in-focus state.

The characteristic of polymer-dispersed liquid crystals in general is such that, the liquid crystal takes a transmitting state when an electric field is applied and takes a diffusing state when no electric field is applied. Therefore, with the exception of an area where a superimposed display is to be made, peripheral areas of the liquid crystal must be turned into the transmitting state. For this purpose, the transparent electrode 44 is arranged to bring about an electric field between it and the transparent electrode 35 which is opposed to it to keep the peripheral part in the transmitting state.

Switches 45, 46 and 47 are arranged to be turned on and off by a control circuit which is not shown. More specifically, the switch 45 is provided for applying or not applying an electric field to the transparent electrode 41. The switch 46 is provided for applying or not applying an electric field to the transparent electrode 42. The switch 47 is provided for applying or not applying an electric field to the transparent electrode 43. Each of these switches 45, 46 and 47 is arranged to apply an electric field to bring about the transmitting state when its switching position is at a contact "a" and to bring about the diffusing state by applying no electric field when its position is at another contact "b". A superimposed display can be provided for any of the left, middle and right focus detecting points as desired by shifting the position of a contact piece of one of the switches 45, 46 and 47 to the contact "a" or "b".

This embodiment is arranged to open and close the mechanical switches. However, the arrangement may be changed to use semiconductor switches in place of the mechanical switches. Further, in this case, the wiring might show up as a voltage is applied from outside. That problem, however, can be solved by arranging the wiring to have a sufficiently thin width to make it invisible.

The embodiment described above has advantages in the following point. A superimposed display which has been provided according to the prior art by using a plurality of light emitting sources can be provided by using only one light emitting source. Since the arrangement of the embodiment obviates the necessity of adjusting the angle of illumination by the light emitting source and the necessity of use of a lens for narrowing the illumination angle and requires no viewfinder mat having minute prisms formed, the number of necessary parts can be greatly reduced to permit cost reduction.

Figure 5:
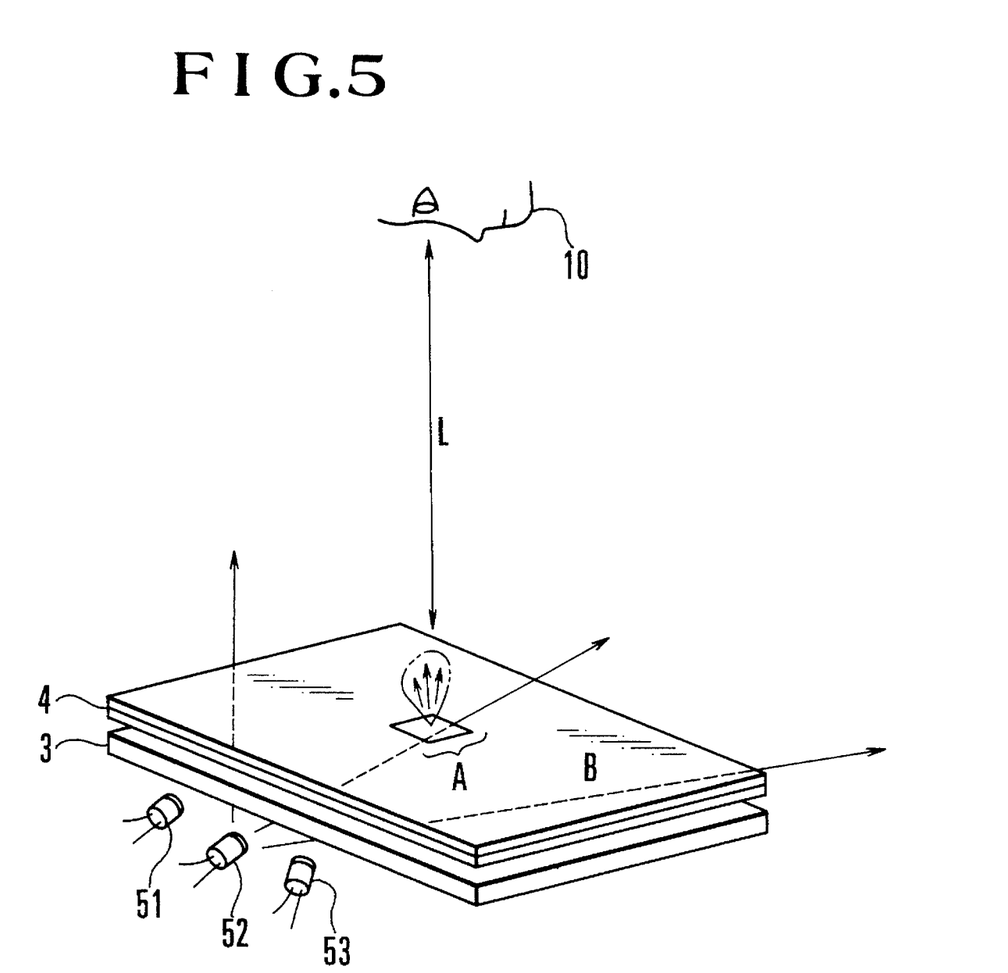
FIG. 5 is an oblique view showing a viewfinder of a single-lens reflex camera to which this invention is applied as a second embodiment thereof.

FIG. 5 shows in an oblique view a viewfinder of a single-lens reflex camera having a superimposed display device which is arranged as a second embodiment of this invention to provide a display in a plurality of colors. The illustration includes a focusing screen 3, a liquid crystal plate 4 and a photographer 10. In FIG. 5, the parts which are the same as those shown in FIG. 2 are indicated by the same reference numerals. A light emitting diode 51 is arranged to emit light of a red color. A light emitting diode 52 is arranged to emit light of a green color. A light emitting diode 53 is arranged to emit light of a blue color. Like in the case of FIG. 2, a pentagonal prism and an eyepiece lens are omitted from illustration in FIG. 5. The photographer 10 is shown as in a position which is optically equivalent to a position actually obtained with the pentagonal prism and the eyepiece lens existing there.

In FIG. 5, the light emitting diode 52 is shown as in a state of emitting light. The second embodiment operates on the same principle as the first embodiment. A light flux which passes through a part A which is made into a diffusing state in the liquid crystal plate 4 is scattering. Therefore, a part of the scattered light is seen by the photographer 10 to give a superimposed display. In this instance, the superimposed display is provided in a green color.

Figure 6A:
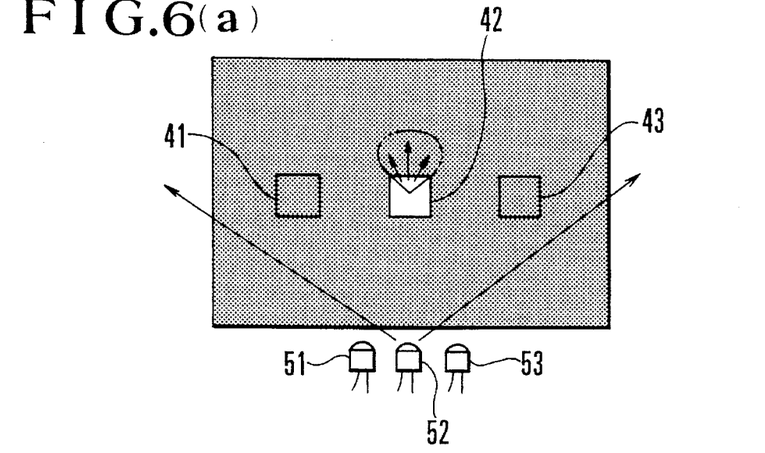
FIGS. 6(a), 6(b) and 6(c) show cases where light emitting diodes of FIG. 5 having different colors of light from each other are respectively emitting light.
Figure 6B:
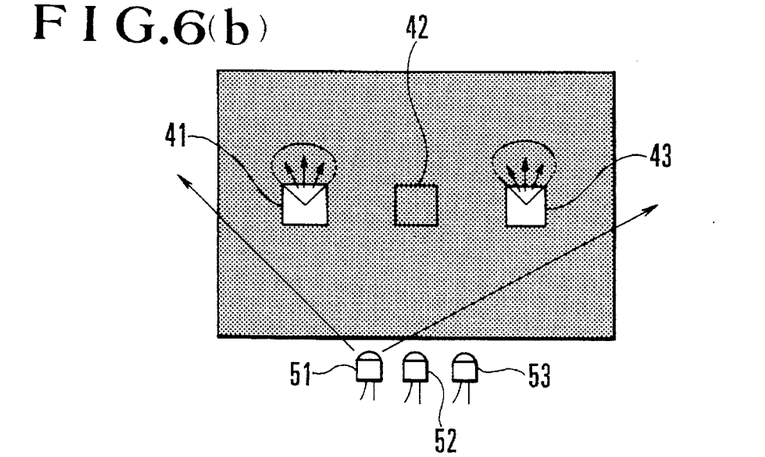
Figure 6C:
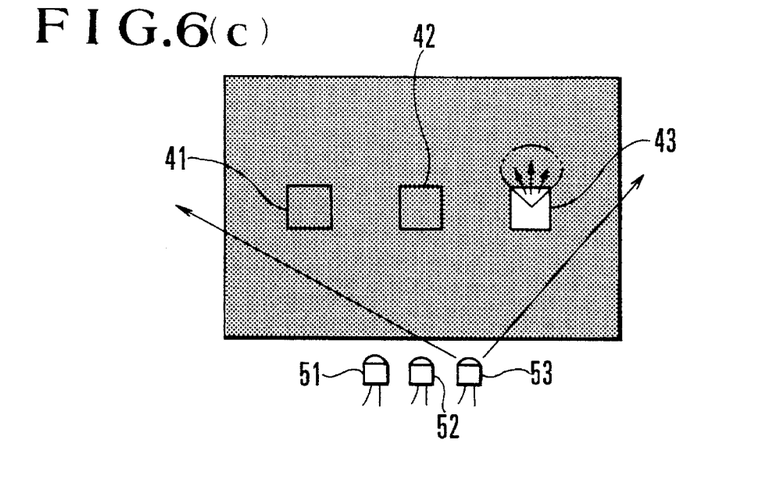

FIGS. 6(a), 6(b) and 6(c) show the liquid crystal plate 4 as in the same shapes as those actually seen by the photographer. Referring to these figures, transparent electrodes 41, 42 and 43 are disposed in positions which correspond to the left, middle and right focus detecting points provided for automatic focusing. The light emitting diodes 51, 52 and 53 are arranged to emit light respectively in red, green and blue colors, as mentioned above with reference to FIG. 5.

FIG. 6(*a*) shows a state in which the middle focus detecting point is in focus and is shown in a state of being lighted up in a green color. In this case, the light emitting diode 52 emits light. An electric field is applied, excluding only the middle part where the transparent electrode 42 is located. This part is in the diffusing state. In the drawing, the area which is in the diffusing state is shown with white, while the area which is in the transmitting state is shown with shading. FIG. 6(*b*) shows a state in which the left and right focus detecting points excluding the middle point are in focus and are shown in a state of being lighted up in a red color. In that case, the light emitting diode 51 emits light and an electric field is applied, excluding only the parts where the transparent electrodes 41 and 43 are located to cause these parts to be in the diffusing state. FIG. 6(*c*) shows a state in which the right focus detecting point is in focus and is shown in a state of being lighted up in a blue color. The light emitting diode 53 then emits light. An electric field is applied excluding only the part where the right transparent electrode 43 is located to cause this part to be in the diffusing state.

As apparent from the description given above, a superimposed display can be provided in any of a plurality of colors by arranging a plurality of light emitting sources of different light colors according to the arrangement of the second embodiment.

In a case where the states of FIGS. 6(*a*), 6(*b*) and 6(*c*) are to be switched from one over to another at a high speed of, for example, 100 Hz or above, a perceptional delay in following the switching causes the states of FIGS. 6(*a*), 6(*b*) and 6(*c*) to be seen in a combined state by the photographer, so that a plurality of display colors can be simultaneously observed. In other words, with a plurality of light emitting sources arranged to be lighted up in a time sharing manner, a color display can be provided by switching the state of the liquid crystal plate for the transmitted light between the diffusing state and the transmitting state in synchronism with the time sharing lighting-up of the light emitting sources.

In the case of FIGS. 6(*a*), 6(*b*) and 6(*c*), a rose color which is a mixture of the red light emission color and the blue light emission color is seen by looking at the position of the right focus detecting point. Other mixtures of colors obtainable by the above-stated arrangement include a yellow color which is a mixture of red and green and a light purple color which is a mixture of green and blue.

While the second embodiment has been described, by way of example, as arranged to display an in-focus position in automatic focusing, the display can be made to give a larger amount of information by displaying, for example, an in-focus point in green, a small-defocus-amount-detection point in blue, and an excessive-blurred-state-detection point or a focus detecting point where focus is hardly detectable in red.

Further, in addition to the focus display for automatic focusing, the display device according to this invention can be applied to a single-lens reflex camera for a wider range of displays, for example, including:

1) A display of a light measuring area;

2) A display showing in color such areas that are likely to be over-exposed or under-exposed; and 3) A display of a shooting area or a non-shooting area in the event of panorama photography.

Some of single-lens reflex cameras are arranged to display pictographs or letters along the peripheral parts of viewfinder images as well as displays superimposed on viewfinder images. This invention can be advantageously applied to such a display arrangement.

Figure 7:
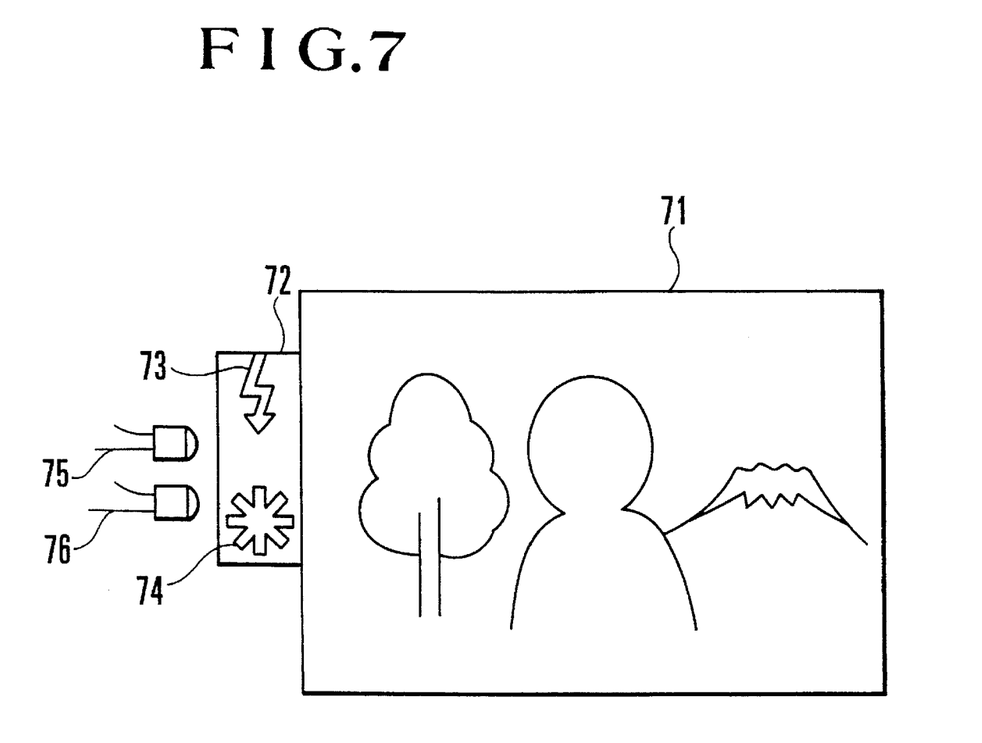
FIG. 7 is a schematic illustration showing a viewfinder of a single-lens reflex camera to which this invention is applied as a third embodiment thereof.

FIG. 7 shows a case where a pictograph which indicates completion of preparation for flash photography (hereinafter referred to as a flash photography mark) and another pictograph which indicates that the amount of exposure is fixed (hereinafter referred to as an AE lock mark) are arranged on the left side of a viewfinder image.

Referring to FIG. 7, a viewfinder image is displayed in an area 71. A light transmitting member 72 which is capable of switching between a diffusing state and a transmitting state. The light transmitting member 72 may be a liquid crystal plate made of a polymer-dispersed liquid crystal and is of the same structure as the liquid crystal plate of the embodiment described in the foregoing. A transparent electrode 73 corresponds to the flash photography mark. A transparent electrode 74 corresponds to the AE lock mark. Reference numeral 75 denotes a red light emitting diode and reference numeral 76 denotes a green light emitting diode. Both of the light emitting diodes 75 and 76 are arranged to have the flash photography mark 73 and the AE lock mark 74 within the angle of illumination.

With the viewfinder display part arranged in the manner as described above, if it is desired to light up the flash photography mark 73 in a green color, a part of the light transmitting member 72 corresponding to the flash photography mark 73 is alone turned into the diffusing state by applying no electric field to that part and causing the light emitting diode 76 to emit its light obliquely from behind. This action causes only the part which is in the diffusing state to be seen by the photographer. In lighting up the AE lock mark 74 in a red color, a part of the light transmitting member 72 corresponding to the AE lock mark 74 is alone turned into the diffusing state by applying no electric field to that part and causing the light emitting diode 75 to emit its light obliquely from behind. As a result, the photographer is allowed to see only the AE lock mark 74 in the part which is turned into the diffusing state.

In a case where it is desired to display both the flash photography mark 73 and the AE lock mark 74 in green, the parts of both the marks 73 and 74 are turned into the diffusing state and the green light emitting diode 76 is caused to emit light. Further, both of the marks 73 and 74 can be displayed in red by causing the red light emitting diode 75 to emit light while the parts of both the marks 73 and 74 are in the diffusing state.

If it is desired to have the flash photography mark 73 displayed in green and, at the same time, the AE lock mark 74 displayed in red, the display device is operated as follows. The green light emitting diode 76 is caused to emit light while the part corresponding to the flash photography mark 73 is turned into the diffusing state. This state is assumed to be called a state A. The red light emitting diode 75 is caused to emit light while the part corresponding to the AE lock mark 74 is turned into the diffusing state. That state is assumed to be called a state B. Then, both the red and green displays are made to be simultaneously observable by repeatedly switching the states A and B from one over to the other at a high speed of at least 100 Hz. Further, it is also possible, like in the case of the second embodiment, to have them displayed in an orange color which is a mixture of red and green.

In the case of modification shown by way of example in FIG. 7, the flash photography mark and the AE lock mark are arranged to be displayed in a simplified manner. This arrangement, however, can be easily changed to display photographic information, such as a shutter time value or an aperture value, in a plurality of colors in the form of alignment of seven segments, by simply increasing the number of the transparent electrodes as necessary.

While this invention is applied to a single-lens reflex camera in the case of each of the embodiments described above, this invention is applicable to a lens-shutter type camera, a video camera, a still video camera and also to an optical apparatus or device other than cameras. Further, this invention may be carried out by combining as necessary the embodiments or their technological elements described in the foregoing.

As described in the foregoing, the embodiment is arranged to illuminate by a single light emitting source the whole surface of a light transmitting member which is capable of switching between a diffusing state and a transmitting state for a transmitted light. Under this condition, any part of the light transmitting member which is not necessary for a display is kept in the transmitting state and a part which is to be used for a superimposed display is turned into the diffusing state, so that the superimposed display can be made only in a necessary part of a picture plane in the same color as the color of light of the light emitting source.

Even in cases where it is necessary to provide a plurality of displays independently of each other, these displays can be provided by using a single light emitting source. It is not necessary to adjust the illumination angle of the light emitting source. The embodiment dispenses with a lens which is otherwise necessary for adjustment of the illumination angle of the light source. Besides, the arrangement of the embodiment obviates the necessity of forming microprisms on the surface of the light transmitting member.

Further, with a plurality of light emitting sources provided for illuminating with different colors of light the light transmitting member which is capable of switching between the diffusing state and the transmitting state for a transmitted light, these light emitting sources are arranged to light up in a time sharing manner and the switchover of the diffusing state and the transmitting state is arranged to be effected in synchronism with the time sharing lighting-up of these light emitting sources. The arrangement thus permits to obtain, at a low cost, a display device which is capable of providing displays viewable in a plurality of colors of light.

What is claimed is:

1. A display device comprising:
   a display element having a plurality of electrode areas and arranged to selectively take a transmitting state and a diffusing state by controlling an electric field; and
   a light emitting source disposed in such a position as to make an illumination color thereof visually confirmable only in an electrode area of said display element which is made into the diffusing state.

2. A display device according to claim 1, wherein said display element is made of a polymer-dispersed liquid crystal and takes the transmitting state in an area thereof where an electric field is imparted and the diffusing state in an area where no electric field is imparted.

3. A display device according to claim 1, wherein said display element is provided with a plurality of electrode areas so as to cause a plurality of areas to be turned into the diffusing state.

4. A display device according to claim 1, wherein said light emitting source is a single source.

5. A display device according to claim 2, wherein said light emitting source is a single source.

6. A display device according to claim 3, wherein said light emitting source is single source, and wherein the illumination color of said light emitting source is visually confirmable in a plurality of areas which are turned into the diffusing state.

7. A display device according to claim 1, wherein said light emitting source includes a plurality of elements arranged to emit light in different colors.

8. A display device according to claim 2, wherein said light emitting source includes a plurality of elements arranged to emit light in different colors.

9. A display device according to claim 3, wherein said light emitting source includes a plurality of elements arranged to emit light in different colors, and wherein the illumination color of said light emitting source is visually confirmable in a plurality of areas which are turned into the diffusing state.

10. A display device according to claim 7, further comprising a control circuit for causing said plurality of elements to light up in a time sharing manner.

11. A display device comprising:
    a display element disposed on an optical axis of an image, having a plurality of electrode areas and arranged to selectively take a transmitting state and a diffusing state by controlling an electric field, the image being visually confirmable in an area which is made into the transmitting state; and
    a light emitting source disposed in such a position as to make an illumination color thereof visually confirmable only in an electrode area of said display element which is made into the diffusing state,
    wherein said area which is made into the diffusing state is displayed in a state of being superimposed on a display of said image.

12. A display device according to claim 11, wherein said display element is made of a polymer-dispersed liquid crystal and takes the transmitting state in an area thereof where an electric field is imparted and the diffusing state in an area where no electric field is imparted.

13. A display device according to claim 11, wherein said display element is provided with a plurality of electrode areas so as to cause a plurality of areas to be turned into the diffusing state.

14. A display device according to claim 13, wherein said light emitting source is single source, and wherein the illumination color of said light emitting source is visually confirmable in a plurality of areas which are turned into the diffusing state.

15. A display device according to claim 13, wherein said light emitting source includes a plurality of elements arranged to emit light in different colors, and wherein the illumination color of said light emitting source is visually confirmable in a plurality of areas which are turned into the diffusing state.

16. A display device according to claim 15, further comprising a control circuit for causing said plurality of elements to light up in a time sharing manner.

17. A display device according to claim 11, further comprising a viewfinder optical system arranged to guide said image to a viewfinder.

18. A display device according to claim 17, wherein said display element is disposed adjacent to an image forming plane of said viewfinder optical system on which said image is formed.

19. A display device according to claim 18, wherein said light emitting source is disposed adjacent to said image forming plane.

20. A display device according to claim 12, further comprising a viewfinder optical system arranged to guide said image to a viewfinder.

21. A display device according to claim 20, wherein said display element is disposed adjacent to an image forming plane of said viewfinder optical system on which said image is formed.

22. A display device according to claim 21, wherein said light emitting source is disposed adjacent to said image forming plane.

* * * * *